(12) United States Patent
Allen et al.

(10) Patent No.: US 7,806,448 B2
(45) Date of Patent: Oct. 5, 2010

(54) VEHICLE BUMPER SYSTEM WITH ENERGY ABSORBER

(75) Inventors: Kent Allen, Royal Oak, MI (US); Brian Joseph Czopek, Macomb, MI (US); Eric D. Kowal, Macomb, MI (US); Sandeep Kulkarni, Bangalore (IN); Dhanendra Kumar Nagwanshi, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/264,521

(22) Filed: Nov. 4, 2008

(65) Prior Publication Data

US 2010/0109353 A1     May 6, 2010

(51) Int. Cl.
*B60R 19/18* (2006.01)
(52) U.S. Cl. .................................. 293/120; 293/121
(58) Field of Classification Search .............. 293/120, 293/121, 132, 133
See application file for complete search history.

(56) References Cited

U.S. PATENT DOCUMENTS

| | | | |
|---|---|---|---|
| 4,533,166 | A | 8/1985 | Stokes |
| 5,549,327 | A | 8/1996 | Rusche et al. |
| 6,082,792 | A | 7/2000 | Evans et al. |
| 6,247,745 | B1 | 6/2001 | Carroll, III et al. |
| 6,406,081 | B1 | 6/2002 | Mahfet et al. |
| 6,663,150 | B1 | 12/2003 | Evans |
| 6,669,251 | B2 | 12/2003 | Trappe |
| 6,672,635 | B2 | 1/2004 | Weissenborn et al. |
| 6,726,262 | B2 | 4/2004 | Marijnissen et al. |
| 6,866,313 | B2 | 3/2005 | Mooijman et al. |
| 6,874,832 | B2 | 4/2005 | Evans et al. |
| 6,923,494 | B2 | 8/2005 | Shuler et al. |
| 6,938,936 | B2 | 9/2005 | Mooijman et al. |
| 6,971,690 | B2 | 12/2005 | Evans et al. |
| 6,994,384 | B2 | 2/2006 | Shuler et al. |
| 6,997,490 | B2 | 2/2006 | Evans et al. |
| 7,044,515 | B2 | 5/2006 | Mooijman et al. |
| 7,073,831 | B2 | 7/2006 | Evans |
| 7,086,690 | B2 | 8/2006 | Shuler et al. |
| 7,131,674 | B2 | 11/2006 | Evans et al. |
| 7,134,700 | B2 | 11/2006 | Evans |

(Continued)

FOREIGN PATENT DOCUMENTS

EP     0683072 A2     11/1995

(Continued)

OTHER PUBLICATIONS

International Search Report; International Application No. PCT/US2009/061620; International Filing Date: Oct. 22, 2009; Date of Mailing: Mar. 22, 2010; 7 Pages.

(Continued)

*Primary Examiner*—Joseph D Pape
(74) *Attorney, Agent, or Firm*—Cantor Colburn LLP (57) ABSTRACT

A vehicle bumper system includes a beam configured to attach to a vehicle and a thermoformed energy absorber positioned on the beam. The energy absorber comprises a frame and a crush lobe extending from the frame. The crush lobe comprises a lobe wall extending between the frame and an outer wall. The change in lobe wall thickness may be constant. The outer wall is curved away from the frame.

31 Claims, 7 Drawing Sheets

U.S. PATENT DOCUMENTS

| | | |
|---|---|---|
| 7,147,258 B2 | 12/2006 | Evans et al. |
| 7,160,621 B2 | 1/2007 | Chaudhari et al. |
| 7,163,242 B2 | 1/2007 | Shuler et al. |
| 7,163,243 B2 | 1/2007 | Evans |
| 7,188,876 B2 | 3/2007 | Jaarda et al. |
| 7,222,896 B2 | 5/2007 | Evans |
| 7,222,897 B2 * | 5/2007 | Evans et al. ................. 293/120 |
| 7,278,667 B2 | 10/2007 | Mohapatra et al. |
| 7,296,833 B2 | 11/2007 | Mohapatra et al. |
| 2003/0080573 A1 * | 5/2003 | Marijnissen et al. ........ 293/132 |
| 2004/0094977 A1 | 5/2004 | Shuler et al. |
| 2004/0174025 A1 | 9/2004 | Converse et al. |
| 2005/0161982 A1 | 7/2005 | Cormier et al. |
| 2006/0145491 A1 * | 7/2006 | Shuler et al. ................ 293/120 |
| 2006/0255602 A1 | 11/2006 | Evans |
| 2007/0108778 A1 * | 5/2007 | Evans et al. ................. 293/120 |
| 2007/0114772 A1 | 5/2007 | Evans |
| 2007/0200376 A1 | 8/2007 | Jaarda et al. |
| 2008/0001416 A1 | 1/2008 | Chaudhari et al. |

FOREIGN PATENT DOCUMENTS

WO         03037688 A1     5/2003

OTHER PUBLICATIONS

Written Opinion for the International Searching Authority; International Application No. PCT/US2009/061620; International Filing Date: Oct. 22, 2009; Date of Mailing: Mar. 22, 2010; 7 Pages.

\* cited by examiner

FIG. 12

VEHICLE BUMPER SYSTEM WITH ENERGY ABSORBER

BACKGROUND

This disclosure relates generally to energy absorbing structures, particularly energy absorbers used in vehicle bumper systems.

Energy absorbing systems broadly find application in many situations where excess energy needs to be managed, without causing damage to surrounding objects. For example, in the automotive industry, such systems are also referred to as Energy Absorbers (EA) and find application in bumper systems of cars and the like.

Typically, bumpers are designed to absorb most of the impact in case of collisions with other objects, including vehicles, stationary objects or pedestrians, to minimize damage. The energy absorbers used in bumpers need to absorb the energy of low speed collisions to minimize vehicle damage and preserve vehicle safety, yet minimize the damage to pedestrians in low speed collisions as well. Varying performance requirements have been established by organizations such as the National Highway Traffic Safety Administration (NHTSA), Insurance Institute for Highway Safety (IIHS), and the Research Council for Automobile Repairs (RCAR). Other standards include the United States Federal Motor Vehicle Safety Standard and the Canada Motor Vehicle Safety Standard.

To meet today's rigorous safety standards while satisfying the requirements of current vehicle styling trends there exists a need for energy absorbing systems which are lightweight, cost effective, perform in small and large package space situations equally, and require minimum tooling expenses that meet both low volume and high volume build requirements. In general, there exists a need for energy absorbing systems capable of absorbing more energy at a lower mass, both within automotive applications and non-automotive applications.

A bumper system generally includes a beam that extends widthwise across the front or rear of a vehicle and is mounted to rails that extend in a lengthwise direction. The beam typically is made of steel or another rigid material, and the beam is stiff and provides structural strength and support.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

Foam energy absorbers have been used. However, foam based energy absorbers typically have slow loading upon impact, which results in a high displacement. This can be undesirable due to vehicle styling trends such as "low-offset bumpers" which minimize the amount of displacement available to the bumper system. Further, foams are effective to a sixty or seventy percent compression, and beyond that point, foams become incompressible so that the impact energy is not fully absorbed. The remaining impact energy is absorbed through deformation of the beam and/or vehicle structure.

It would be desirable to provide a bumper system or assembly which can meet required safety standards, is lightweight, reduces package space between the beam and fascia, and can minimize damage to both vehicle and pedestrian in vehicle-pedestrian collisions.

BRIEF DESCRIPTION

Disclosed, in various embodiments, are energy absorbers and bumper systems and assemblies comprising such energy absorbers. Their configuration promotes high efficiency and fast loading in a small volume. This provides flexibility in designing bumper systems with reduced overhang while enhancing the impact performance of the system. Among other things, enhanced bumper impact performance translates to reduced costs of repair for low speed "fender benders" and greater occupant safety during higher speed collisions.

Disclosed in one embodiment is a bumper system for a vehicle, comprising a beam configured in a manner to be coupled to the vehicle; and a thermoformed energy absorber positioned on the beam. The energy absorber comprises a frame and at least one crush lobe extending from the frame. The crush lobe comprises an outer wall spaced apart from the frame at a lobe depth and a lobe wall extending between the frame and the outer wall; wherein the lobe wall has a base thickness near the frame and a outer thickness near the outer wall, the base thickness being less than the outer thickness; and the outer wall is crowned away from the frame.

The lobe wall may be tapered so that the cross-sectional area of the outer wall is less than the cross-sectional area defined by the intersection of the frame and the lobe wall. The lobe wall might also have a draft angle of from 0° to about 20° relative to a plane perpendicular to the frame. In other embodiments, the change in thickness of the lobe wall occurs in a constant manner or at a non-constant rate.

In further embodiments, the base thickness may be from about 0.4 mm to about 3.0 mm. The outer thickness may be from about 1.0 mm to about 5.0 mm. The lobe depth may be from about 15 mm to about 150 mm.

The bumper system may also comprise at least two crush lobes, wherein the two crush lobes are joined together by a connecting lobe, the connecting lobe comprising a forward wall spaced apart from the frame at a forward depth less than the lobe depth.

The bumper system may further have a plurality of crush lobes, wherein the lobe depth of the crush lobes near the center of the beam are greater than the lobe depth of the crush lobes near the ends of the beam.

In other embodiments, a thermoformed energy absorber for use in a vehicle is disclosed. The energy absorber comprises a frame and at least one crush lobe extending from the frame. The crush lobe comprises an outer wall spaced apart from the frame at a lobe depth and a lobe wall extending between the frame and the outer wall; wherein the lobe wall has a base thickness near the frame and a outer thickness near the outer wall, the base thickness being less than the outer thickness; and the outer wall is crowned away from the frame.

In yet other embodiments, a bumper assembly is disclosed which comprises: a beam; a thermoformed energy absorber positioned on the beam; and a fascia positioned and sized to envelop the beam and the energy absorber. The energy absorber comprises a frame and at least one crush lobe extending from the frame. The crush lobe has an outer wall spaced apart from the frame at a lobe depth and a lobe wall extending between the frame and the outer wall. The lobe wall has a base thickness near the frame and a outer thickness near the outer wall, the base thickness being less than the outer thickness; and the outer wall is curved away from the frame.

In further embodiments, a thermoformed energy absorber is provided that is made from a polymeric resin that has both high modulus and high ductility. Such resins comprise a secondary nano-fibrillated network which enables the use of fillers to increase modulus while still maintaining the high elongation at break that is required to absorb energy.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

A bumper system that includes a tunable energy absorber is described below in detail. An energy absorber is positioned on, coupled to, attached, or substantially affixed to a beam. The beam is a body, with one dimension large compared to the other dimensions, whose function is to carry lateral loads (perpendicular to the large dimension) and bending movements. It is generally fabricated from a rigid material, such as steel.

The energy absorber, in exemplary embodiments, is fabricated from a polymeric material and is tunable (i.e. adjustable in certain constructions) so as to meet desired impact criteria, e.g., pedestrian and low speed impacts. For example, impact forces that are generated during the specified types of impacts are maintained just below a predetermined level by deforming the energy absorber and beam until the kinetic energy of the impact event has been absorbed. When the impact is over, the energy absorber returns substantially to its original shape and retains sufficient integrity to withstand subsequent impacts.

The energy absorber may be optionally covered by a fascia or facing member, and/or may be included therein. The fascia is optionally included for aesthetics, functional, or safety purposes.

Figure 1:
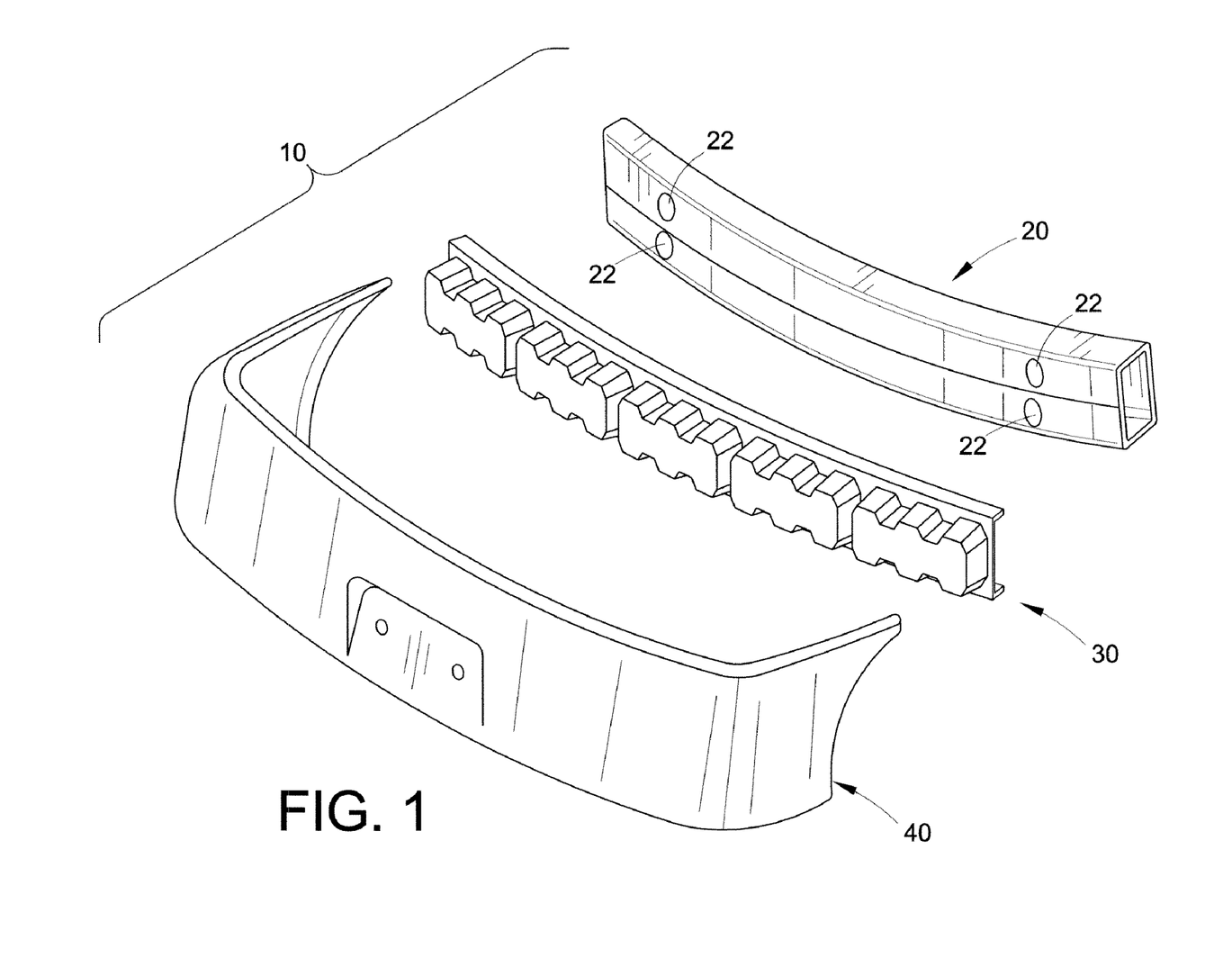
FIG. 1 is an exploded perspective view of an embodiment of a bumper assembly.

FIG. 1 is an exploded perspective view of an embodiment of a bumper assembly 10. The bumper assembly 10 includes a beam 20, an energy absorber 30, and a fascia 40. The energy absorber 30 is positioned between the beam 20 and the fascia 40. The beam 20 can be attached to rails (not shown) extending from the frame (not shown) of the vehicle. The vehicle may be any vehicle, including but not limited to, transportation vehicles, which generally have a bumper, such as an automobile, truck, bus, SUV, crossover, recreational vehicle, tractor, construction vehicle, etc., to prevent damage to the body of the vehicle and/or the object being impacted.

The fascia 40 is generally formed from a thermoplastic material which can be finished with conventional vehicle painting and/or coating techniques. The fascia is typically positioned and sized to envelop the beam and the energy absorber, such that neither component is visible once attached to the vehicle. Although usually fabricated as one piece, the fascia can also be a combination of several pieces.

The beam 20 can be fabricated from suitable materials, such as extruded aluminum, roll formed steel, or a compression molded glass mat thermoplastic (GMT). Generally, the beam materials and fabrication technique are selected to result in a stiff beam. The beam can have one of several geometries, such as a B-section, a D-section, an I-beam, or having a C or W cross-sectional shape. The geometry is selected to provide a desired section modulus depending on the particular application in which the beam is to be used. The beam also includes openings 22 so that bolts can be used to secure the beam (and hence the bumper system or assembly) to the frame rails of the vehicle. Other means for affixing the bumper system to the frame are also contemplated.

Figure 2:
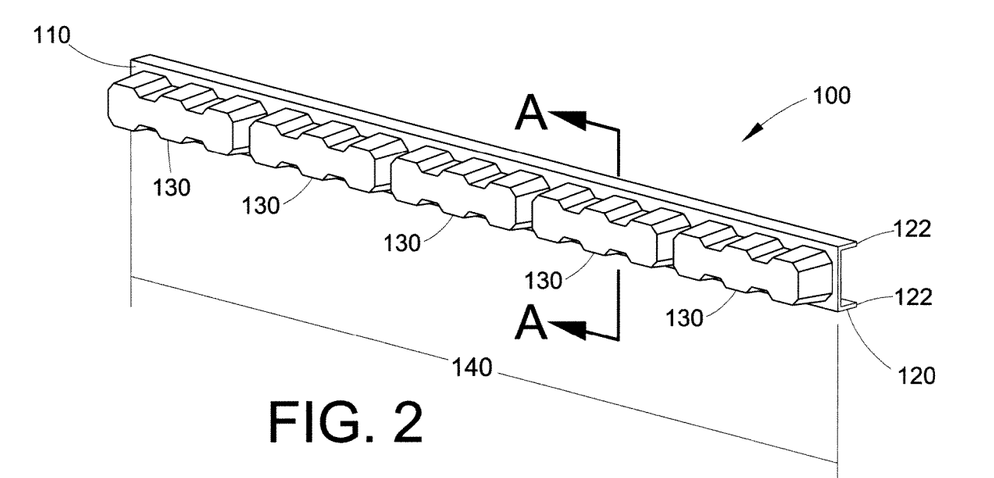
FIG. 2 is a front perspective view of one embodiment of an energy absorber of the present disclosure.
Figure 3:
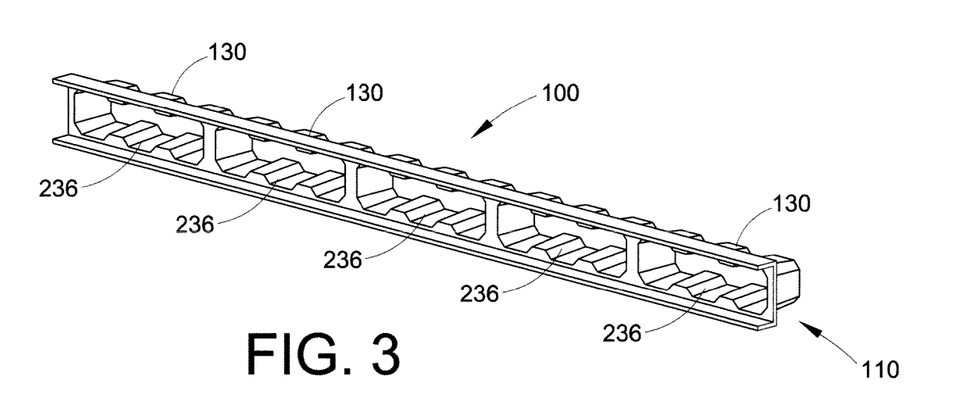
FIG. 3 is a rear perspective view of the energy absorber of FIG. 2.
Figure 4:
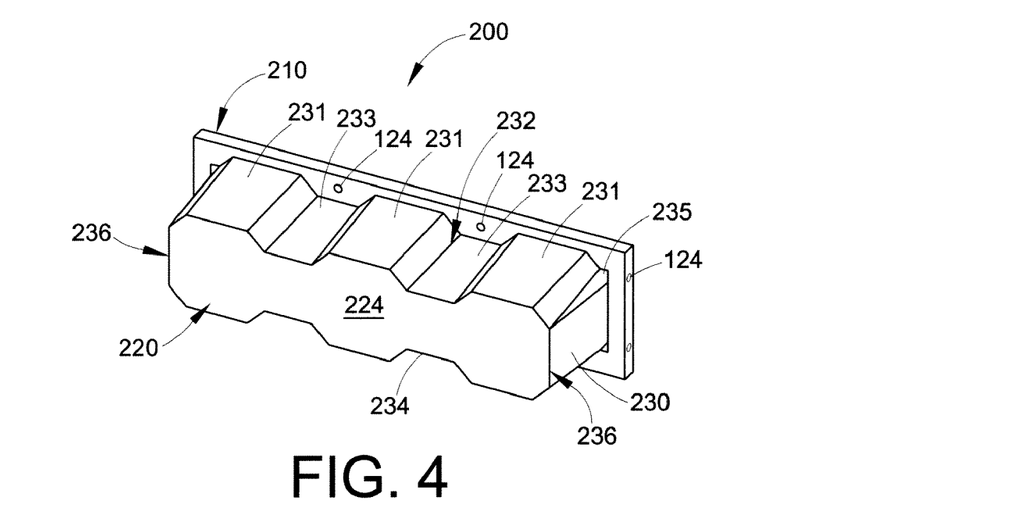
FIG. 4 is a front perspective view of one embodiment of a crush lobe of the present disclosure.

Referring to FIGS. 2 and 3, the energy absorber 100 includes a frame 110. The frame includes means 120 for attaching the energy absorber to the beam. For example, as shown here, flanges 122 extend from the frame 110 and snap onto the beam 20. Alternatively, as shown in FIG. 4, bores 124 are included in the frame to allow fasteners, such as screws, to connect the energy absorber to the frame. As another option, the energy absorber could be shaped to press fit or snap fit to the beam.

The energy absorber 100 further comprises at least one crush lobe 130 that extends from the frame. The energy absorber shown here depicts five (5) crush lobes which together form an elongated crush or compression zone 140. The crush or compression zone is designed to compress upon the application of a certain degree of force.

Figure 5:
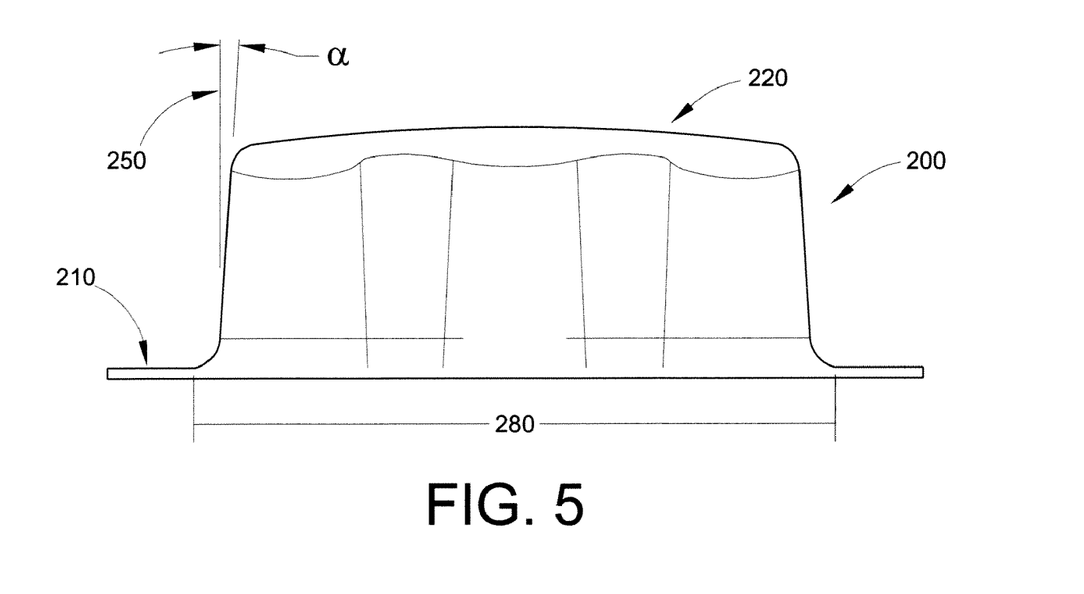
FIG. 5 is a top view of the crush lobe of FIG. 4.
Figure 6:
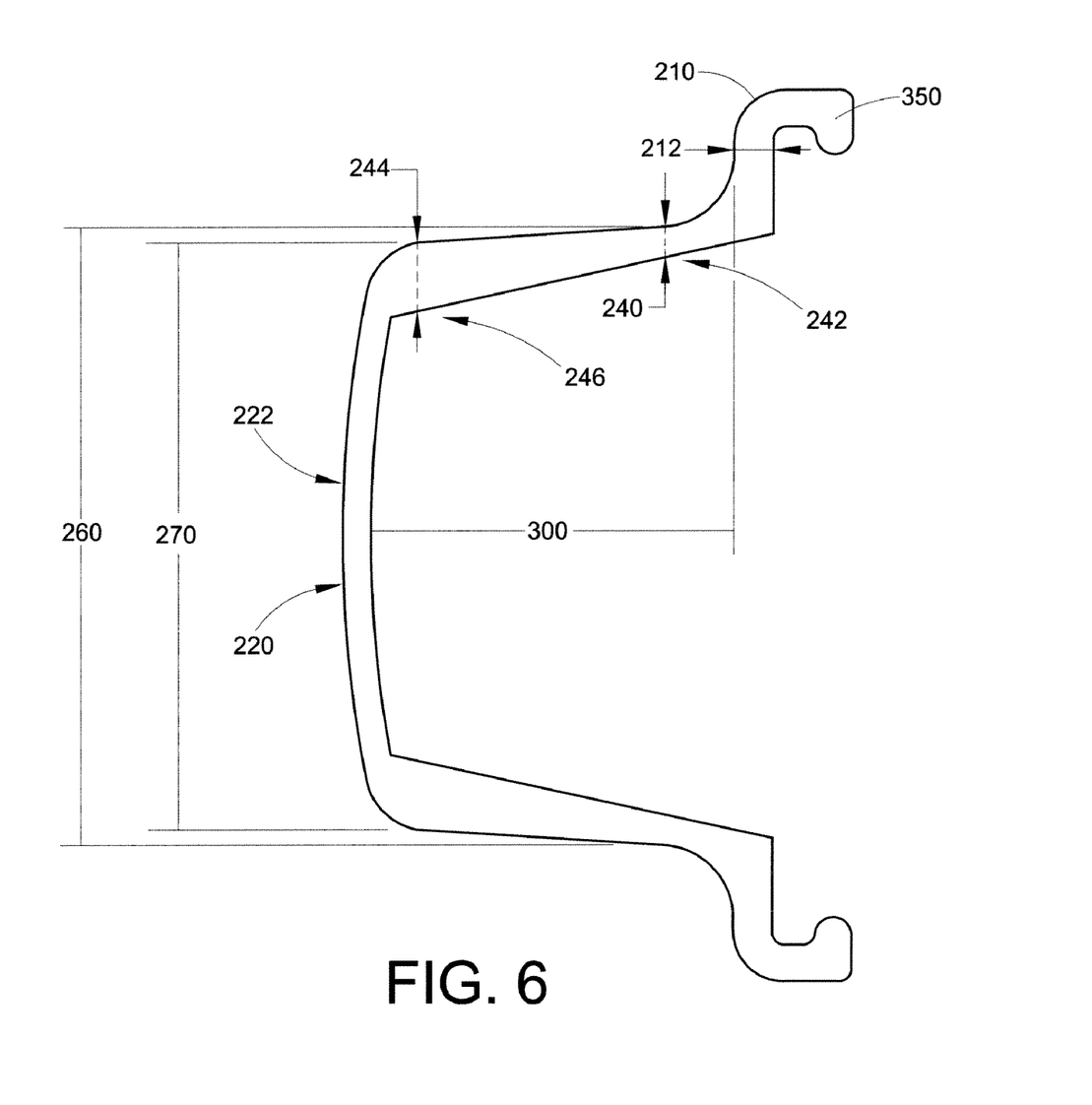
FIG. 6 is a cross-sectional side view of a crush lobe of the present disclosure taken along line A-A of FIG. 2.

Referring to FIGS. 4, 5, and 6, each crush lobe 200 extends from the frame 210. Each crush lobe 200 comprises an outer wall 220 spaced apart from the frame 210 and a lobe wall 230 which extends between the frame 210 and the outer wall 220. Each lobe wall 230 may alternatively be considered as comprising a top wall 232, a bottom wall 234, and two side walls 236, each of these walls extending between the frame and the outer wall. The lobe wall 230 has a base thickness 240 at a location 242 near the frame and a outer thickness 244 at a location 246 near the outer wall. The base thickness 240 is less than the outer thickness 244. In addition, the outer wall 220 can be crowned or arched away from the frame 210. In other words, the outer surface 222 of the outer wall 220 is curved, as seen more clearly in FIG. 5. This curvature or crowned surface reduces thinning (as explained further herein) and induces proper crushing of the crush lobes. Generally, the walls of the crush lobe will not have a constant thickness. Flanges 350 extend backwards from the frame 210 and serve as means for attaching the energy absorber to the beam, for example by snap fitting.

The lobe wall 230 is tapered so that the cross-sectional area 224 of the outer wall is less than the cross-sectional area defined by the intersection of the frame 210 and the lobe wall 230 (i.e. area 236 of FIG. 3). In more particular embodiments, the lobe wall 230 is angled to make a draft angle α of from about 0° to about 20°, including from about 3° to about 10° and about 4° relative to a plane 250 perpendicular to the frame 210. For example, as depicted here the crush lobe 200 has a base width 260 of about 52 mm, an outer width 270 of about 36 mm, and a base length 280 of about 187 mm. In embodiments, the base width may be from about 10 mm to about 100 mm, including from about 35 mm to about 60 mm. The outer width may be from about 10 mm to about 100 mm, including from about 50 mm to about 75 mm. The base length may be from about 50 mm to about 400 mm, including from about 150 mm to about 250 mm.

As seen in FIG. 6, the lobe wall 230 can change thickness in a constant manner, i.e. at a rate which is substantially constant or close to constant, or in a non-constant manner. Changing the rate at which the thickness changes allows for tuning the energy absorber to specific applications. The energy absorber can also be tuned by changing the draft angle α of the sidewalls or the starting thickness of the sheet from which the energy absorber is made (described further below).

Figure 10:
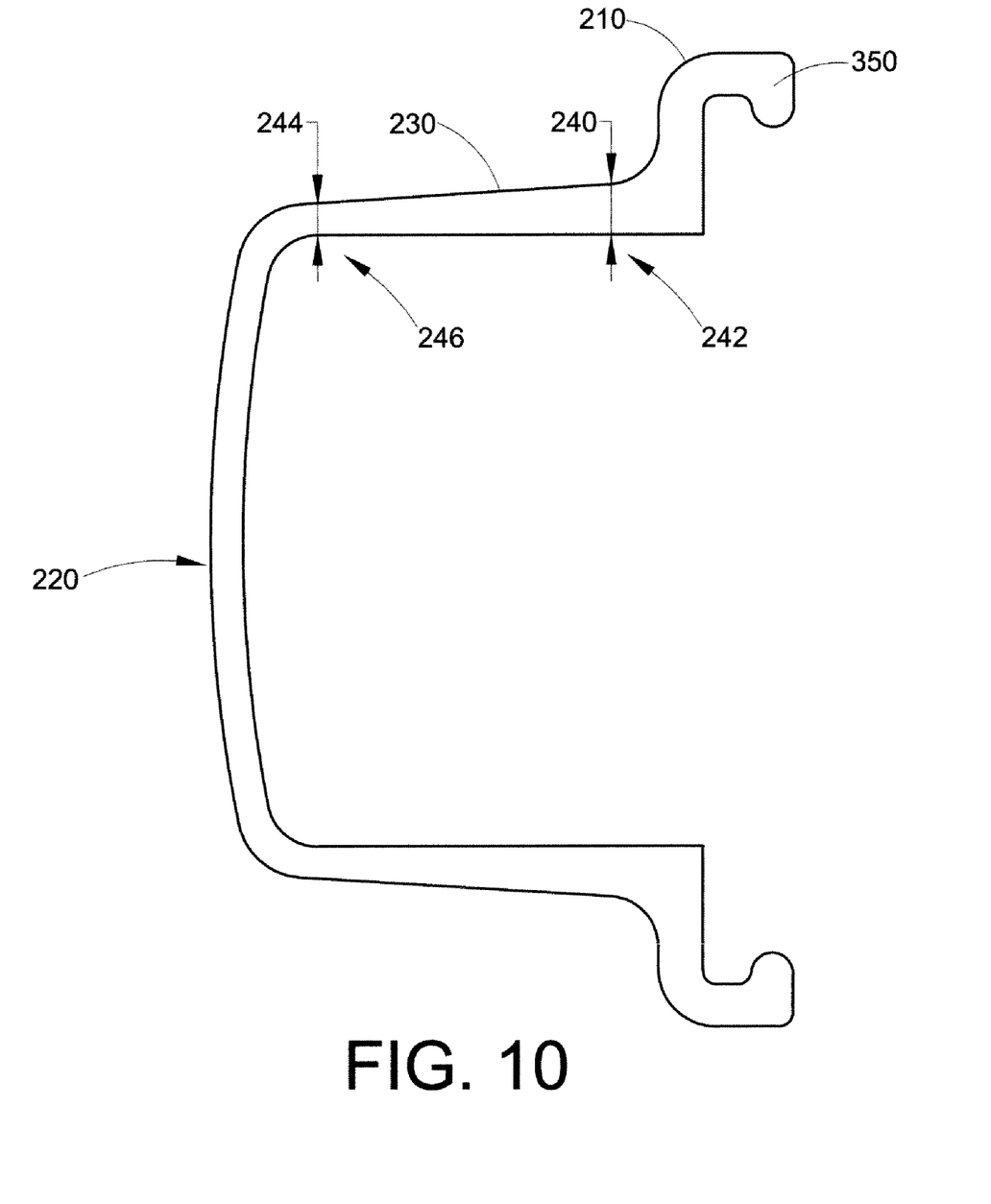
FIG. 10 is a cross-sectional side view of another embodiment of a crush lobe of the present disclosure.

FIG. 10 is a cross-sectional view of another embodiment of a crush lobe of the present disclosure. This crush lobe is similar to that shown in FIG. 5. The crush lobe comprises an outer wall 220 spaced apart from the frame 210 and a lobe wall 230 which extends between the frame 210 and the outer wall 220. Again, the lobe wall may alternatively be considered as comprising a top wall, a bottom wall, and two side walls, each of these walls extending between the frame and the outer wall. The lobe wall 230 has a base thickness 240 at a location 242 near the frame and an outer thickness 244 at a location 246 near the outer wall. However, in this embodiment, the base thickness 240 is equal to or greater than the outer thickness 244. In addition, the outer wall 220 is crowned or arched away from the frame 210. In other words, the outer surface 222 of the outer wall 220 is curved.

Figures 11, 12:
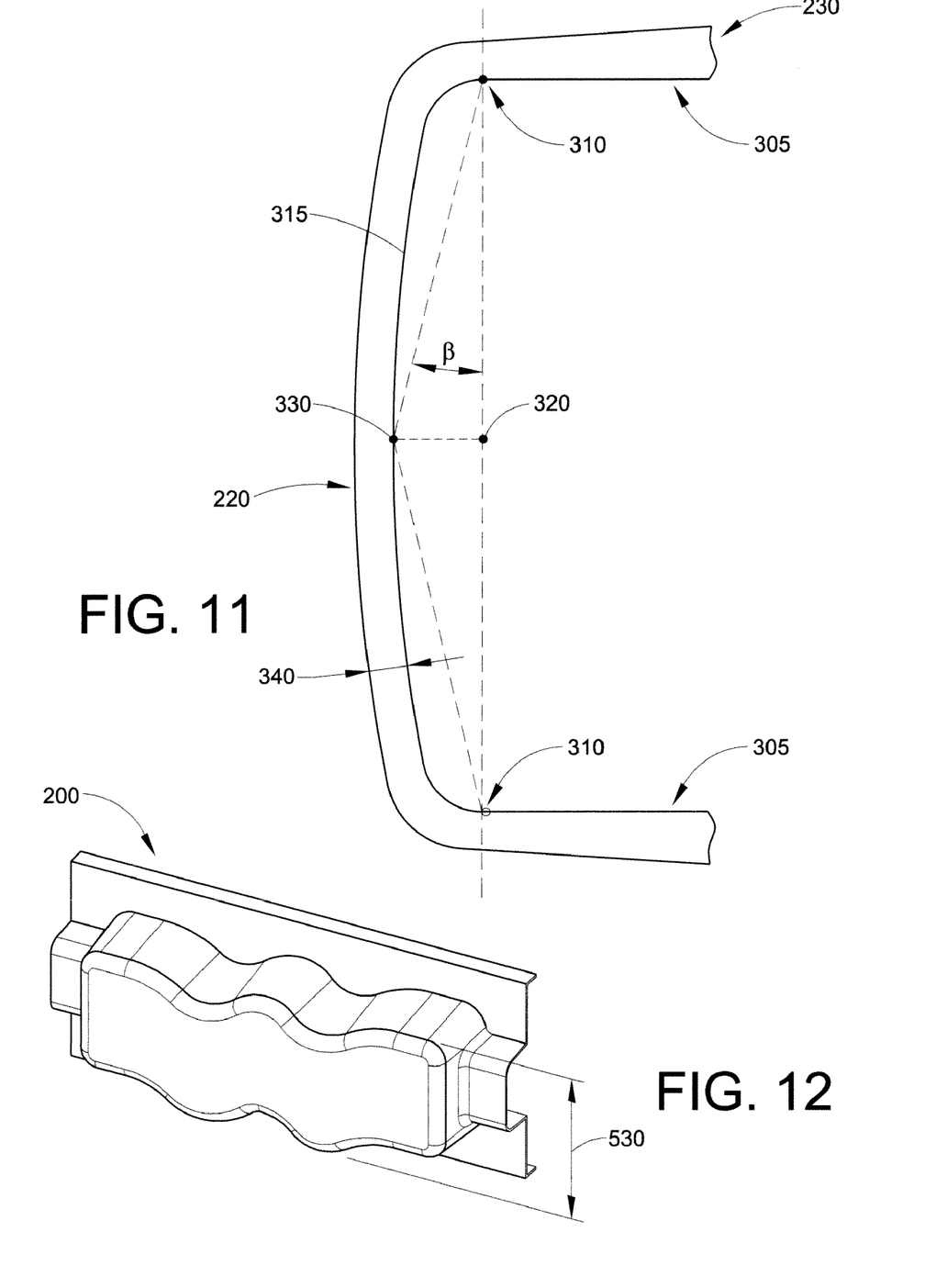
FIG. 11 is a magnified view of the front of the crush lobe shown in FIG. 10.
FIG. 12 is another embodiment of a crush lobe of the present disclosure.

FIG. 11 is a magnified view of the outer wall 220 of the embodiment shown in FIG. 10 and is helpful for explaining the curvature of the outer wall 220. As seen here, the interior wall 305 of the lobe wall 230 tapers down to an endpoint 310 where the outer wall 220 begins. A base point 320 can be defined as the midpoint between the two endpoints 310. A surface point 330 can be defined as the midpoint on the inner surface 315 of the outer wall 220. These points can define two lines, the first line going from endpoint 310 to base point 320 and the second line going from endpoint 310 to surface point 330. An imaginary curve angle β is the angle between these two lines. In embodiments, the curve angle β is at least 2° and in some embodiments is at least 5°. The outer wall may be referred to as having this curve angle β to denote the degree of curvature in the outer wall. Also note that the outer wall 220 has a substantially constant thickness 340. This thickness 340 is from about 0.5 mm to about 2.5 mm and is less than the thickness 212 of the frame 210. The outer wall may be curved outwards in both the depicted side view and from a top view as shown in FIG. 5. In other words, the outer wall may be considered as having an ellipsoidal shape.

In particular embodiments where the base thickness 240 is less than the outer thickness 244, the base thickness 240 may be from about 0.4 mm to about 3.0 mm, including from about 1.7 mm to about 2.4 mm, and the outer thickness 244 may be from about 1.0 mm to about 5.0 mm, including from about 2.3 mm to about 3.0 mm. In embodiments where the base thickness 240 is equal to or greater than the outer thickness 244, the outer thickness 244 may be from about 0.4 mm to about 3.0 mm, including from about 1.7 mm to about 2.4 mm, and the base thickness 240 may be from about 1.0 mm to about 5.0 mm, including from about 2.3 mm to about 3.0 mm. The crush lobe 200 may be formed to have a lobe depth 300 of from about 15 mm to about 150 mm, including from about 45 mm to about 80 mm.

The lobe wall 230 of the crush lobe 200 is shaped as desired to tune the properties of the energy absorber 100. For example, as shown in FIG. 4, the top wall 232 and bottom wall 234 are corrugated (i.e. rippled), including alternating raised areas 231 and depressed areas 233. This undulating shape improves strength and stability, allowing them to resist deflection upon low-speed impacts, and the energy absorber can be tuned by, for example, changing the depth of corrugation. The depth of corrugation may vary, such as up to about 25 mm, including from about 8 mm to about 15 mm. The lobe wall may also include windows 235 with secondary operations which will modify the stiffness characteristics of the crush lobe. Note that FIGS. 5 and 10 are cross-sectional views of the lobe wall through a raised area 231 of the corrugation.

FIG. 12 is a front perspective view of another embodiment of a crush lobe 200 of the present disclosure. The main difference between this figure and that of FIG. 4 is the difference in the corrugation pattern.

The thermoformed energy absorber 100 can be made from any thermoformable material having the desired characteristics. The preferred characteristics of the material utilized to form the energy absorber include high toughness/ductility, thermal stability, high energy absorption capacity, a good modulus-to-elongation ratio and recyclability, among others. Exemplary materials include acrylonitrile-butadiene-styrene (ABS); polycarbonate; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO).

Especially suitable materials are XENOY®, commercially available from SABIC Innovative Plastics. XENOY® resins are a thermoplastic alloy blend of polycarbonate (PC) with polyesters, polybutylene terephthalate (PBT), or polyethylene terephthalate (PET), particularly PBT. XENOY resins are characterized by their ductility, chemical resistance, high temperature dimensional stability and mechanical strength. They also offer very good aesthetics, lubricity, UV resistance and color retention. They are designed to provide resistance to both gasoline and oils, as well as a high level of impact strength at temperatures down to −40° C. In particular, high modulus ductile (HMD) XENOY® resins are suitable due to their balance of high stiffness and ductility. Thermoformed XENOY® allows for reduced packaging space compared to TPO and EPP, for example. Typically, fillers (glass, mineral etc.) are used to increase the modulus of a polymeric resin. However, the addition of filler usually reduces the ductility of the resin (as measured by elongation at break and yield in ASTM D638 tensile strain measurements). XENOY® HMD resins have a secondary nano-fibrillated network which enables the use of fillers to increase modulus, while still maintaining the high elongation at break of unfilled resin that is required to absorb energy. The ductility of HMD resins is also increased significantly, as measured by notched Izod impact tests (ASTM D256). HMD resins also provide better creep and tensile fatigue performance. These HMD resins allow the walls of the energy absorber to be thinner, due to the increased modulus, while still maintaining their structure in typical automotive crash test scenarios. XENOY® X4820 is a suitable resin due to its balance of high stiffness and ductility.

The energy absorber 100 is formed by a thermoforming process. Generally, a sheet of polymeric material is heated. This starting sheet generally has a thickness of 1.0 mm to 4.0 mm, and is thinned out during the thermoforming process. The sheet is then heated and stretched over a mold or between two molds (i.e. positive and negative molds) to provide the desired shape. The curved surface 222 of the outer wall 220 reduces thinning due to thermoforming, particularly when only one mold is used. The starting sheet is generally heated to a temperature much higher than that of the mold. As a result of this difference in temperature, when the outer wall is flat, the entire portion of the starting sheet that first contacts the mold "freezes", becoming much less ductile so that it does not flow. As a result, the lobe wall 230 is formed by stretching only those portions of the sheet not touching the mold, resulting in thinning for those portions. When the outer wall is curved, the starting sheet does not contact the mold all at once over a large area, as it would if the outer wall were flat. Instead, the starting sheet contacts the mold over a longer period of time, allowing the polymeric material to flow from the center of the mold towards the edges, so that the lobe wall does not severely thin restricted portions of the sheet only. Generally, it is desirable to have as thick a lobe wall as possible. The thermoforming can be controlled so that the thickness 340 of the outer wall 220 is different from the thickness 212 of the frame 210. The lobe wall is generally thinned about 5% to 45% compared to the thickness of the starting sheet, including from about 20% to 40%.

The energy absorber is desirably made as a one-piece structure which is then attached to the beam, though it can be made as several components which are assembled together. For instance, several components, each component containing one crush lobe, may be assembled to form an energy absorber. The energy absorber can be molded using a vacuum thermoforming process in combination with a corresponding pressure box. A plastic starting sheet, such as one made of a XENOY® resin, is heated to a softening temperature, which may be about 390° F. to about 440° F. depending on the sheet gauge. The heated sheet is then sandwiched between a lobe tool and the pressure box. The lobe tool is set at a temperature significantly lower than the softening temperature, such as about 260° F. The heated, pliable sheet is drawn against the lobe tool by a vacuum (e.g. ~1 atm pressure) applied from an internal vacuum manifold for a period of time that can be as short as 25 seconds. A vacuum delay, such as one lasting 8 seconds, may be applied to help mitigate surface webbing. Concurrently, the pressure box exerts air pressure (which can be as high as 60 psia) on the other side of the sheet from the lobe tool, which encourages the sheet to contact the tool surface. Next, the pressure is released and the formed crush lobe can be solidified by cooling. Cooling fans, for example, may be used. The lobe tool may include a release coating to allow for easier part removal. The formed lobe part can then be trimmed on a designated trim line to remove any scrap sheeting.

The energy absorber can be formed so that the frame is either flat (i.e. substantially planar) or curved. For example, the energy absorber of FIG. 2 is formed with a planar frame 110. The starting thickness and ductility of the materials used to form the energy absorber allow the energy absorber to take the desired shape of the bumper and/or fascia during installation. Typically, the energy absorber is formed so the frame is curved, as seen in FIG. 1.

Figures 7, 8:
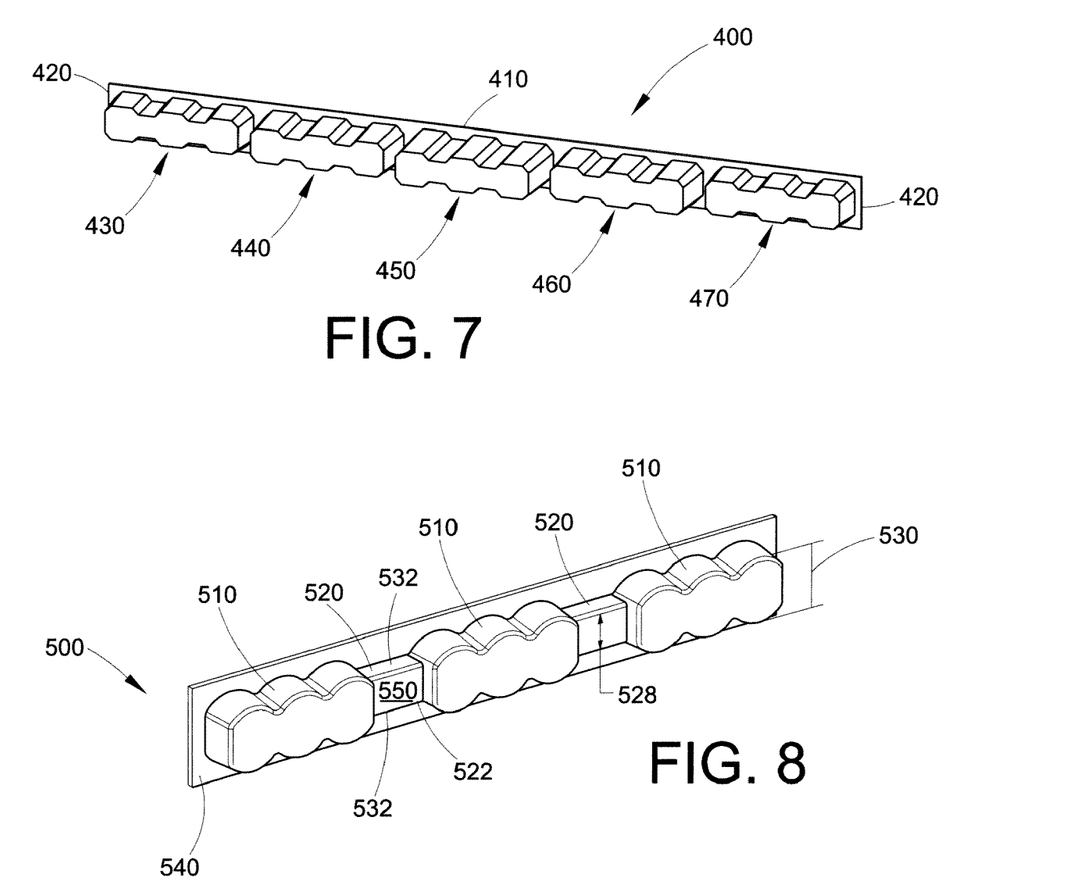
FIG. 7 is a front perspective view of another embodiment of an energy absorber of the present disclosure.
FIG. 8 is a front perspective view of a third embodiment of an energy absorber of the present disclosure.

In additional embodiments, as shown in FIG. 7, the energy absorber 400 contains a plurality of crush lobes spaced apart from each other, some located near the center 410 of the beam and some located near the ends 420 of the beam. The crush lobes can be shaped to follow the bumper or the fascia surface, so the depths of the crush lobes decrease going from the center towards each end of the beam. For example, as shown here, end lobes 430 and 470 are not as deep as intermediate lobes 440 and 460, and center lobe 450 has the greatest depth of the crush lobes shown.

Figure 9:
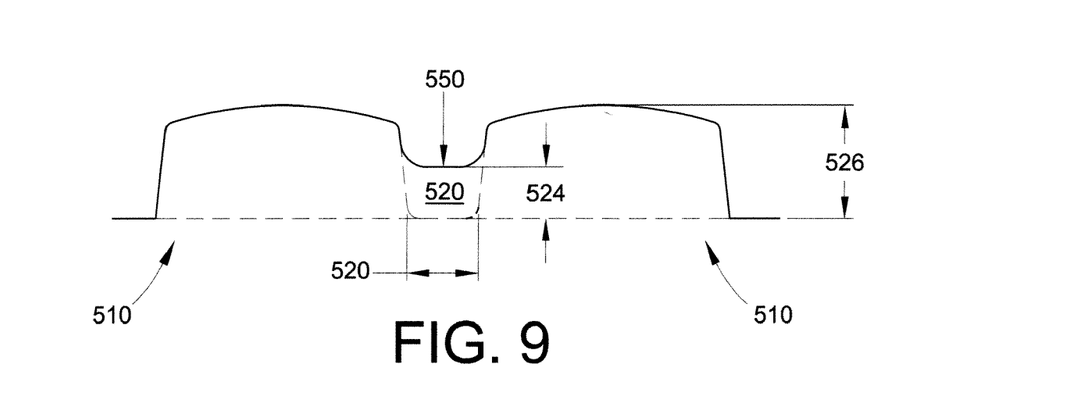
FIG. 9 is a top view of the third embodiment of FIG. 8.

In yet other embodiments, as shown in FIGS. 8 and 9, the energy absorber 500 has at least two crush lobes 510. The two crush lobes are joined together by a connecting lobe 520. This connecting lobe will not be as deep as the crush lobe. In other words, the forward wall 522 of the connecting lobe will be spaced apart from the frame at a forward depth 524 that is less than the lobe depth 526. In particular embodiments, the forward depth is about one-half the lobe depth. In addition, the width 528 of the connecting lobe can be less than the base width 530 of the crush lobe, and in particular embodiments, is about one-half the width of the crush lobe. Two connecting walls 532 extend from the frame 540 to the forward wall 550 of the connecting lobe. The connecting walls may be tapered in the same manner as the lobe walls 230 of the crush lobes. This construction may be particularly useful in vehicle-pedestrian impacts when there is a pedestrian impact between the lobes 510; the connecting lobe 520 will help manage the energy along with the adjacent lobes.

The thermoformed energy absorbers of the present disclosure perform as well as, or better than, convention injection-molded energy absorbers, but at much lower wall thicknesses. This allows the thermoformed energy absorbers to cost less, weigh less, and utilize cheaper tooling while achieving the same performance. Manufacturing using thermoforming processes also has cost advantages over injection molding processes. As a result, it is also possible to use the thermoformed energy absorber in vehicle platforms that injection-molded energy absorbers currently cannot be used in, due to cost and/or weight concerns. They can be used on the front and rear of the car and may also offer some protection from side impacts, knee impacts, and/or head impacts.

The following examples are provided to illustrate the compositions and methods of the present disclosure. The examples are merely illustrative and are not intended to limit devices made in accordance with the disclosure to the materials, conditions, or process parameters set forth therein.

EXAMPLES

Example 1

Three different energy absorbers were modeled on a computer and tested using finite element analysis.

Comparative Example C1 used crush lobes with properties similar to those of injection-molded XENOY® resins. Examples E1 and E2 used crush lobes with properties similar to those of thermoformed HMD XENOY® resins. The energy absorbers each had five crush lobes separated by 60 mm. Each crush lobe was 187 mm long, 52 mm wide at the base (i.e. near the frame), and 36 mm wide at the outer surface (i.e. on the outer wall), and 50 mm deep.

The crush lobes of C1 had a constant lobe wall thickness of 2.9 mm. The total mass of each crush lobe was about 134 grams.

The crush lobes of E1 were modeled with three zones. This was done for computer-aided engineering (CAE) purposes and simplified both the modeling and analytical processes. The lobe wall thickness in the zone near the base of the crush lobe was 2.4 mm; the lobe wall thickness in the intermediate zone was 2.7 mm; and the lobe wall thickness in the zone near the outer wall was 3.0 mm. The outer wall itself had a thickness of ~3.0 mm. The total mass of each crush lobe was about 101 grams.

Similarly, the crush lobes of E2 had three zones. The lobe wall thickness in the zone near the base of the crush lobe was 1.7 mm; the lobe wall thickness in the intermediate zone was 2.0 mm; and the lobe wall thickness in the zone near the outer wall was 2.3 mm. The outer wall itself had a thickness of ~2.3 mm. The total mass of each crush lobe was about 83 grams.

The energy absorbers were modeled and tested using a vehicle with a mass of 1400 kilograms and an impact speed of 2.5 mph. The impact energy was 874.3 joules. They were tested for both barrier impact and center pendulum impact. The intrusion (i.e. how much the crush lobe shrank) and the force were measured. The results are shown in Table 1.

TABLE 1

|  | Example | Intrusion (mm) | Force (kN) |
|---|---|---|---|
| Barrier 2.5 mph | C1 | 17 | 103.5 |
|  | E1 | 10 | 180.2 |
|  | E2 | 17.4 | 111.2 |
| Pendulum 2.5 mph | C1 | 47 | 39.9 |
|  | E1 | 29.2 | 69.9 |
|  | E2 | 40.6 | 42.9 |

The energy absorbers E1 and E2 showed much higher efficiency in both cases, as indicated by the higher force, and greater stiffness, as indicated by the lower intrusion. The wall thicknesses of E2 provided intrusion and force values very similar to C1, but at a much lower mass.

Example 2

An energy absorber having one crush lobe was modeled and tested using a pedestrian leg form, a test that simulates hitting a pedestrian in the leg. The crush lobe had a depth of 67 mm and five thickness zones. Again, this simplified the modeling. Zone 1 was closest to the outer wall and zone 5 was closest to the frame. Zone 1 had a wall thickness of 1 mm; zone 2 had a wall thickness of 0.9125 mm; zone 3 had a wall thickness of 0.825 mm; zone 4 had a wall thickness of 0.7375 mm; and zone 5 had a wall thickness of 0.65 mm. The modeled crush lobe had a weight of about 56 grams.

The results of the crush lobe model were then compared to test results for an actual crush lobe. The actual crush lobe had a depth of 67 mm and a constantly varying thickness. The results are shown in Table 2.

TABLE 2

|  | Acceleration (g) | Rotation (°) | Shear (mm) |
|---|---|---|---|
| Model | 136.9 | 13.2 | 2.6 |
| Actual | 136 | 12.9 | 3.1 |

An excellent correlation was observed in the results for the computer modeled energy absorber and the actual energy absorber. This indicated that the computer models were good simulations of performance for actual energy absorbers.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A bumper system for a vehicle, comprising:
   a beam configured to couple to the vehicle; and
   a thermoformed energy absorber positioned on the beam, the energy absorber comprising:
   a frame; and
   at least one crush lobe extending from the frame, the crush lobe comprising an outer wall spaced apart from the frame at a lobe depth and a lobe wall extending between the frame and the outer wall;
   wherein the lobe wall has a base thickness near the frame and an outer thickness near the outer wall, the base thickness being less than the outer thickness; and
   the outer wall is curved away from the frame.

2. The bumper system of claim 1, wherein the lobe wall is tapered so that the cross-sectional area of the outer wall is less than the cross-sectional area defined by the intersection of the frame and the lobe wall.

3. The bumper system of claim 2, wherein the lobe wall has a draft angle of from 0° to about 20° relative to a plane perpendicular to the frame.

4. The bumper system of claim 1, wherein the change in thickness of the lobe wall occurs at a non-constant rate.

5. The bumper system of claim 1, wherein the change in thickness of the lobe wall occurs in a constant manner.

6. The bumper system of claim 1, wherein the base thickness is from about 0.4 mm to about 3.0 mm.

7. The bumper system of claim 1, wherein the outer thickness is from about 1.0 mm to about 5.0 mm.

8. The bumper system of claim 1, wherein the lobe depth is from about 15 mm to about 150 mm.

9. The bumper system of claim 1, comprising at least two crush lobes, wherein the two crush lobes are joined together by a connecting lobe, the connecting lobe comprising a forward wall spaced apart from the frame at a forward depth less than the lobe depth.

10. The bumper system of claim 1, having a plurality of crush lobes, wherein the lobe depth of the crush lobes near the center of the beam are greater than the lobe depth of the crush lobes near the ends of the beam.

11. The bumper system of claim 1, wherein the energy absorber is formed from a thermoplastic alloy blend of a polycarbonate with a polyester, polybutylene terephthalate, or polyethylene terephthalate, the blend having high modulus and high ductility.

12. The bumper system of claim 1, wherein the energy absorber is formed so that the frame is substantially planar.

13. A thermoformed energy absorber for use in a vehicle, the energy absorber comprising:
   a frame; and
   at least one crush lobe extending from the frame, the crush lobe comprising an outer wall spaced apart from the frame at a lobe depth and a lobe wall extending between the frame and the outer wall;

wherein the lobe wall has a base thickness near the frame and an outer thickness near the outer wall, the base thickness being less than the outer thickness; and the outer wall is curved away from the frame.

14. The energy absorber of claim 13, wherein the lobe wall is tapered so that the cross-sectional area of the outer wall is less than the cross-sectional area defined by the intersection of the frame and the lobe wall.

15. The energy absorber of claim 14, wherein the lobe wall has a draft angle of from 0° to about 20° relative to a plane perpendicular to the frame.

16. The energy absorber of claim 13, wherein the change in thickness of the lobe wall occurs at a non-constant rate.

17. The energy absorber of claim 13, wherein the change in thickness of the lobe wall occurs in a constant manner.

18. The energy absorber of claim 13, wherein the energy absorber is formed from a thermoplastic alloy blend of a polycarbonate with a polyester, polybutylene terephthalate, or polyethylene terephthalate, the blend having high modulus and high ductility.

19. A bumper assembly, comprising:

a beam;

a thermoformed energy absorber positioned on the beam, the energy absorber comprising:

a frame; and at least one crush lobe extending from the frame, the crush lobe comprising an outer wall spaced apart from the frame at a lobe depth and a lobe wall extending between the frame and the outer wall;

wherein the lobe wall has a base thickness near the frame and an outer thickness near the outer wall, the base thickness being less than the outer thickness; and a fascia positioned and sized to envelop the beam and the energy absorber.

20. The bumper assembly of claim 19, wherein the change in thickness of the lobe wall occurs in a constant manner.

21. The bumper assembly of claim 19, wherein the change in thickness of the lobe wall occurs at a non-constant rate.

22. The bumper assembly of claim 19, wherein the energy absorber is formed from a thermoplastic alloy blend of a polycarbonate with a polyester, polybutylene terephthalate, or polyethylene terephthalate, the blend having high modulus and high ductility.

23. A thermoformed energy absorber for use in a vehicle, the energy absorber comprising:

a frame; and at least one crush lobe extending from the frame, the crush lobe comprising an outer wall spaced apart from the frame at a lobe depth and a lobe wall extending between the frame and the outer wall;

wherein the lobe wall has a base thickness near the frame and an outer thickness near the outer wall, wherein the base thickness and the outer thickness are different; and the outer wall is curved away from the frame.

24. The energy absorber of claim 23, wherein the base thickness is greater than the outer thickness.

25. The energy absorber of claim 23, wherein the lobe wall is tapered so that the cross-sectional area of the outer wall is less than the cross-sectional area defined by the intersection of the frame and the lobe wall.

26. The energy absorber of claim 23, wherein the lobe wall has a draft angle of from 0° to about 20° relative to a plane perpendicular to the frame.

27. The bumper system of claim 23, wherein the change in thickness of the lobe wall occurs at a non-constant rate.

28. The energy absorber of claim 23, wherein the change in thickness of the lobe wall occurs in a constant manner.

29. The energy absorber of claim 23, wherein the energy absorber is formed from a thermoplastic alloy blend of a polycarbonate with a polyester, polybutylene terephthalate, or polyethylene terephthalate, the blend having high modulus and high ductility.

30. The energy absorber of claim 23, wherein the outer wall has a curve angle of at least 5°.

31. The energy absorber of claim 23, wherein the outer wall has a thickness of from about 1.0 mm to about 2.5 mm.

* * * * *